(12) United States Patent
Zhang et al.

(10) Patent No.: US 7,983,725 B2
(45) Date of Patent: Jul. 19, 2011

(54) SLIDING MECHANISM AND PORTABLE ELECTRONIC DEVICE USING THE SAME

(75) Inventors: Xu-Ri Zhang, Shenzhen (CN); Ye Liu, Shenzhen (CN); Hsiao-Hua Tu, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 555 days.

(21) Appl. No.: 12/133,517

(22) Filed: Jun. 5, 2008

(65) Prior Publication Data
US 2009/0212675 A1    Aug. 27, 2009

(30) Foreign Application Priority Data
Feb. 25, 2008   (CN) .......................... 2008 1 0300396

(51) Int. Cl.
*H04M 1/00* (2006.01)
(52) U.S. Cl. .................. 455/575.4; 455/575.1; 455/90.3
(58) Field of Classification Search ............... 455/575.4, 455/575.1, 90.3
See application file for complete search history.

(56) References Cited

U.S. PATENT DOCUMENTS

| | | | | |
|---|---|---|---|---|
| 6,973,186 | B2 * | 12/2005 | Shin ......................... | 379/433.12 |
| 7,729,730 | B2 * | 6/2010 | Zuo et al. ................... | 455/575.1 |
| 7,822,446 | B2 * | 10/2010 | Vatanparast et al. ........ | 455/575.4 |
| 2005/0054397 | A1 * | 3/2005 | Kim et al. .................. | 455/575.4 |

FOREIGN PATENT DOCUMENTS
CN         1602027 A        3/2005
* cited by examiner

*Primary Examiner* — Temica M Beamer
(74) *Attorney, Agent, or Firm* — Steven M. Reiss

(57) ABSTRACT

A sliding mechanism (200) includes a first holding member (18), a housing (14), a sliding member (12), a second holding member (24), a fixable member (22) and a driving device (16). The housing is assembled with the first holding member. The sliding member is fixed to the housing. The second holding member includes a rack (2462) formed thereon. The fixable member is fixed to the second holding member and slidably mounted on the sliding member. The driving device includes a motor (62) fixed on the first holding member and a gear (164) mating with the rack, the motor drives the gear to rotate and drive the fixable member to slide.

18 Claims, 6 Drawing Sheets

SLIDING MECHANISM AND PORTABLE ELECTRONIC DEVICE USING THE SAME

BACKGROUND OF THE INVENTION

1. Field of the Invention

The present invention generally relates to a sliding mechanism and a portable electronic device using the same.

2. Description of Related Art

Sliding mechanisms are widely used in portable electronic devices, such as mobile phones and personal digital assistants (PDAs). A typical sliding mechanism usually includes a sliding member, a fixable member and a resilient member. The sliding member is slidably mounted on the fixable member. The resilient member is used to drive the sliding member to slide and/or resume the moved sliding member to its initial position. In use, the covering mechanism is assembled in a portable electronic device including a base and the cover, the fixable member is fixed to the base and the sliding member is fixed to the cover. Thus, the cover can slide back and forth to slide on the base, and covers or exposes keypad(s) mounted on the base.

However, in use of the typical sliding mechanism, the resilient member generally cannot automatically drive the sliding member and the cover to move to predetermined positions. Thus, the portable electronic device using the typical sliding mechanism cannot be conveniently used. Additionally, the resilient member of the sliding mechanism is prone to be worn out with frequent usage.

Therefore, a new sliding mechanism and a new portable electronic device are desired in order to overcome the above-described shortcomings.

BRIEF DESCRIPTION OF THE DRAWINGS

Many aspects of the sliding mechanism and the portable electronic device can be better understood with reference to the following drawings. The components in the drawings are not necessarily drawn to scale, the emphasis instead being placed upon clearly illustrating the principles of the sliding mechanism and the portable electronic device. Moreover, in the drawings, like reference numerals designate corresponding parts throughout the several views.

DETAILED DESCRIPTION OF THE INVENTION

Figure 1:
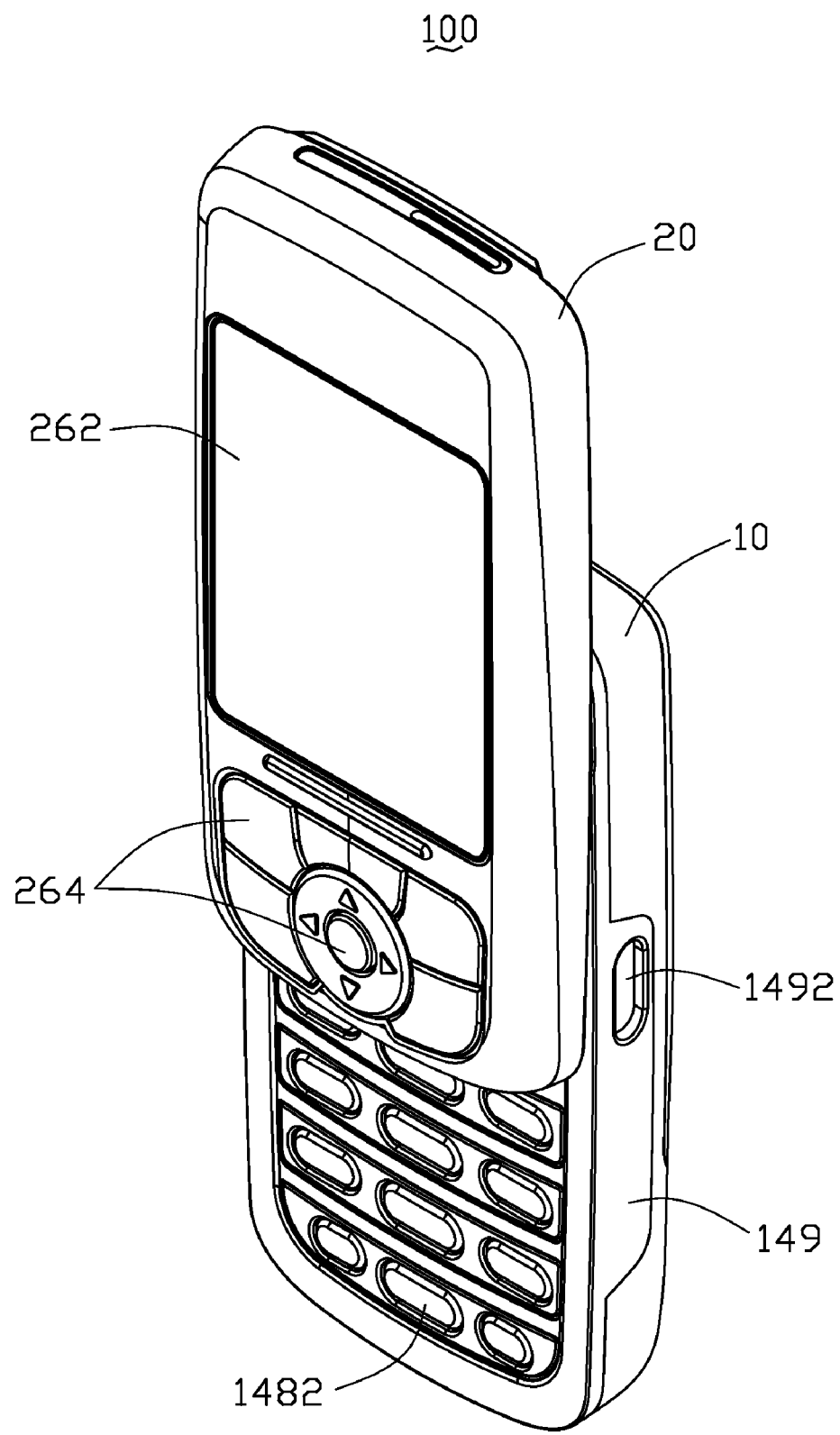
FIG. 1 is a schematic view of a portable electronic device according to an exemplary embodiment.

Referring to FIG. 1, an exemplary portable electronic device 100 according to an exemplary embodiment is shown. The portable electronic device 100 is a mobile phone which includes a base 10 and a cover 20 slidably mounted on the base 10.

Figure 2:
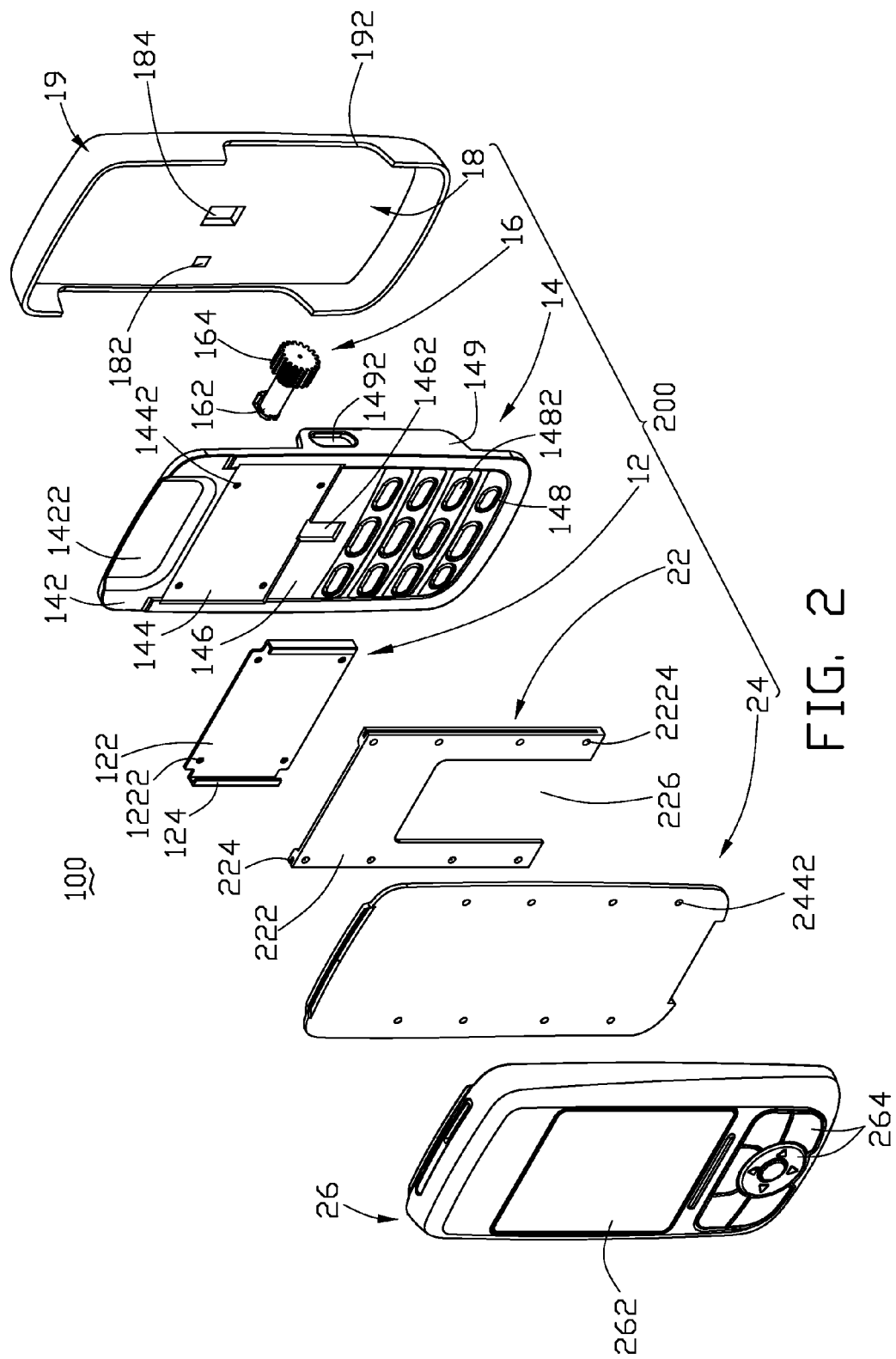
FIG. 2 is a disassembled view of the portable electronic device shown in FIG. 1.
Figure 3:
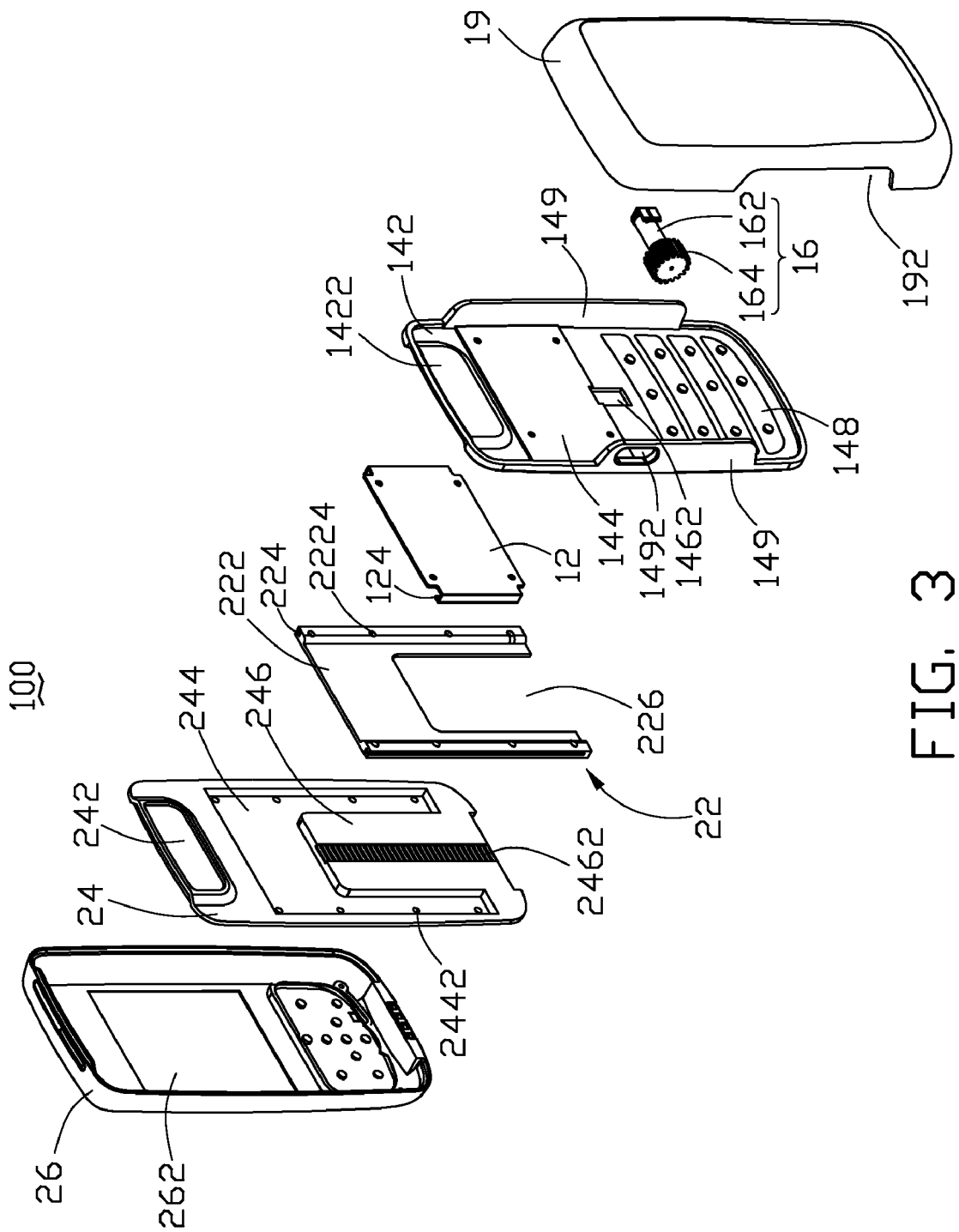
FIG. 3 is similar to FIG. 2, but shown in another visual angle.

Also referring to FIG. 2 and FIG. 3, the base 10 is substantially a planar board and includes a sliding member 12, a first housing 14, a driving device 16, a first holding member 18, and a back panel 19. The sliding member 12, the first housing 14, the first holding member 18, and the back panel 19 are all substantially planar boards, and are positioned substantially parallel to each other. The sliding member 12 includes a first main plate 122 and two sliding rails 124. The first main plate 122 defines a first assembling hole 1222 at each corner thereof. Two parallel sides of the first main plate 122 are bent towards each other to form the two sliding rails 124.

The first housing 14 includes a concave portion 142, an assembling portion 144, a connecting portion 146 and a keypad portion 148 formed thereon, which are arranged from one end of the first housing 14 to another, in the order written. The concave portion 142 is formed on an end of the first housing 14 and defines a recess 1422 therein. The assembling portion 144 has a shape and size corresponding to that of the sliding member 12, and defines a plurality of second assembling holes 1442 corresponding to the first assembling holes 1222. Thus, fasteners (not shown) can be inserted into the first assembling holes 1222 and the second assembling holes 1442 to attach the sliding member 12 and the assembling portion 144. The connecting portion 146 defines a rectangular mating hole 1462 in a central portion thereof. The keypad portion 148 includes buttons 1482 for operating the portable electronic device 100. The housing 14 also includes two ribs 149 formed on two sides thereof. One rib 149 defines a button hole 1492 for assembling a side button (not shown) of the portable electronic device 100 therein.

Figure 4:
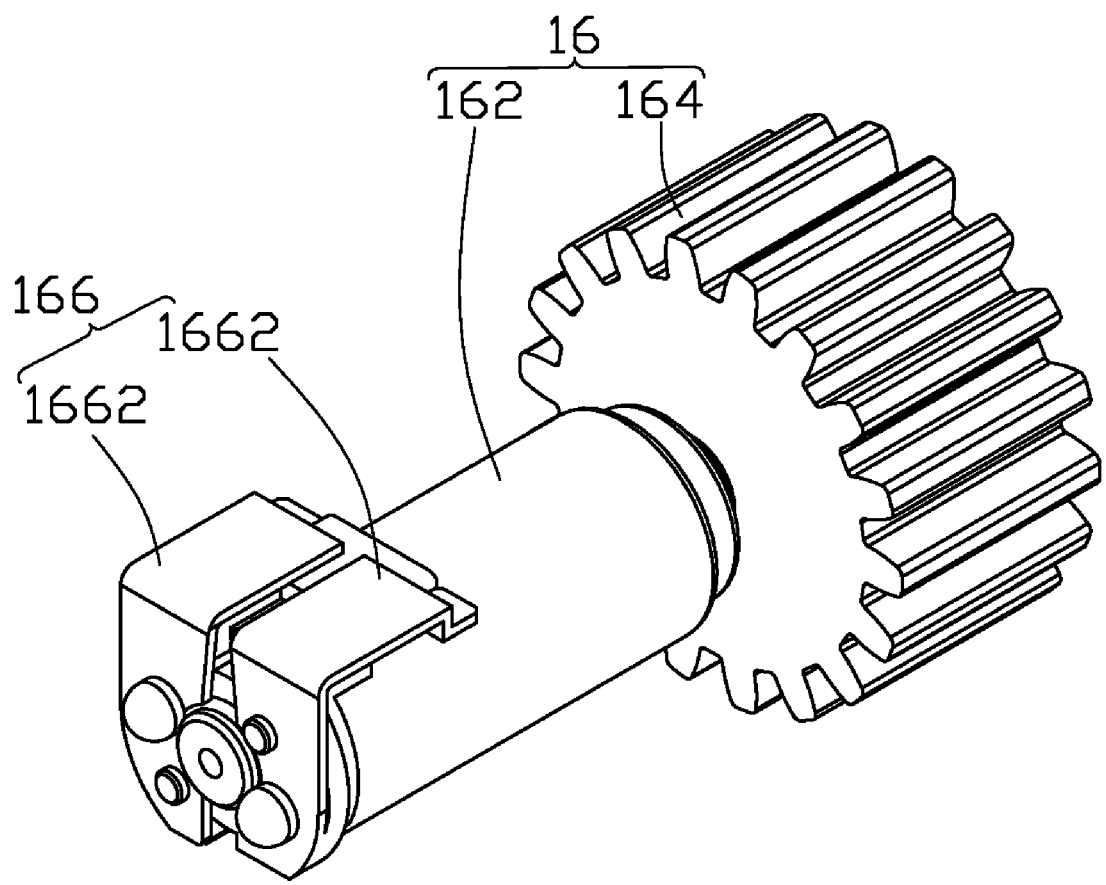
FIG. 4 is a schematic view of a driving device of the portable electronic device shown in FIG. 1.

Also referring to FIG. 4, the driving device 16 includes a motor 162, a gear 164 and a retainer 166. The gear 164 is coaxially fixed to an end of an axle (not labeled) of the motor 162, thus the gear 164 can be rotated by the motor 162. The retainer 166 is formed by two conductive components 1662 bent to be L-shaped, which are mounted on the end of the motor 162 opposite gear 164.

The first holding member 18 is a rectangular printed circuit board. The first holding member 18 includes a retaining portion 182 and a mating portion 184 corresponding to the mating hole 1462 of the first housing 14. The retaining portion 182 is a conductive portion electronically connecting the conductive components 1662 to the first holding member 18. The mating portion 184 is a recessed portion capable of partially receiving the gear 164. The back panel 19 defines two latching grooves 192 corresponding to the ribs 149 of the first housing 14.

The cover 20 is substantially a planar board positioned parallel to the base 10 and includes a fixable member 22, a second holding member 24 and a second housing 26. The fixable member 22, the second holding member 24, and the second housing 26 are all substantially planar boards, and are all positioned substantially parallel to the sliding member 12, the first housing 14, the first holding member 18, and the back panel 19. The fixable member 22 is longer than the sliding member 12. The fixable member 22 includes a second main portion 222, which has two sliding grooves 224 defined on two parallel sides thereof corresponding to the sliding rails 124 and an opening 226 in an end between the two sides thereof. Each sliding groove 224 has an open end and an opposite closed end. The second main portion 222 also defines a plurality of first screw holes 2224 along a vertical direction of the sliding grooves 224.

The second holding member 24 is generally rectangular. The second holding member 24 includes a protruding portion 242 formed on an end at one surface thereof corresponding to the concave portion 142. A receiving groove 244 corresponding to the fixable member 22 is defined adjacent to the protruding portion 242. A rectangular protrusion 246 corresponding to the opening 226 is formed on another end of the second holding member 24 and extends into the receiving groove 244. The second holding member 24 also defines a plurality of second screw holes 2442 corresponding to the first screw holes 2224 of the fixable member 22 therein, thus fasteners (not shown) can attach the fixable member 22 to the second holding member 24. A rack 2462 (see FIGS. 3,6) corresponding to the gear 164 is formed on a surface of the protrusion 246.

The second housing 26 includes a display 262 and buttons 264. The second holding member 24 and the fixable member 22 are received in the second housing 26 to form the cover 20.

Figure 5:
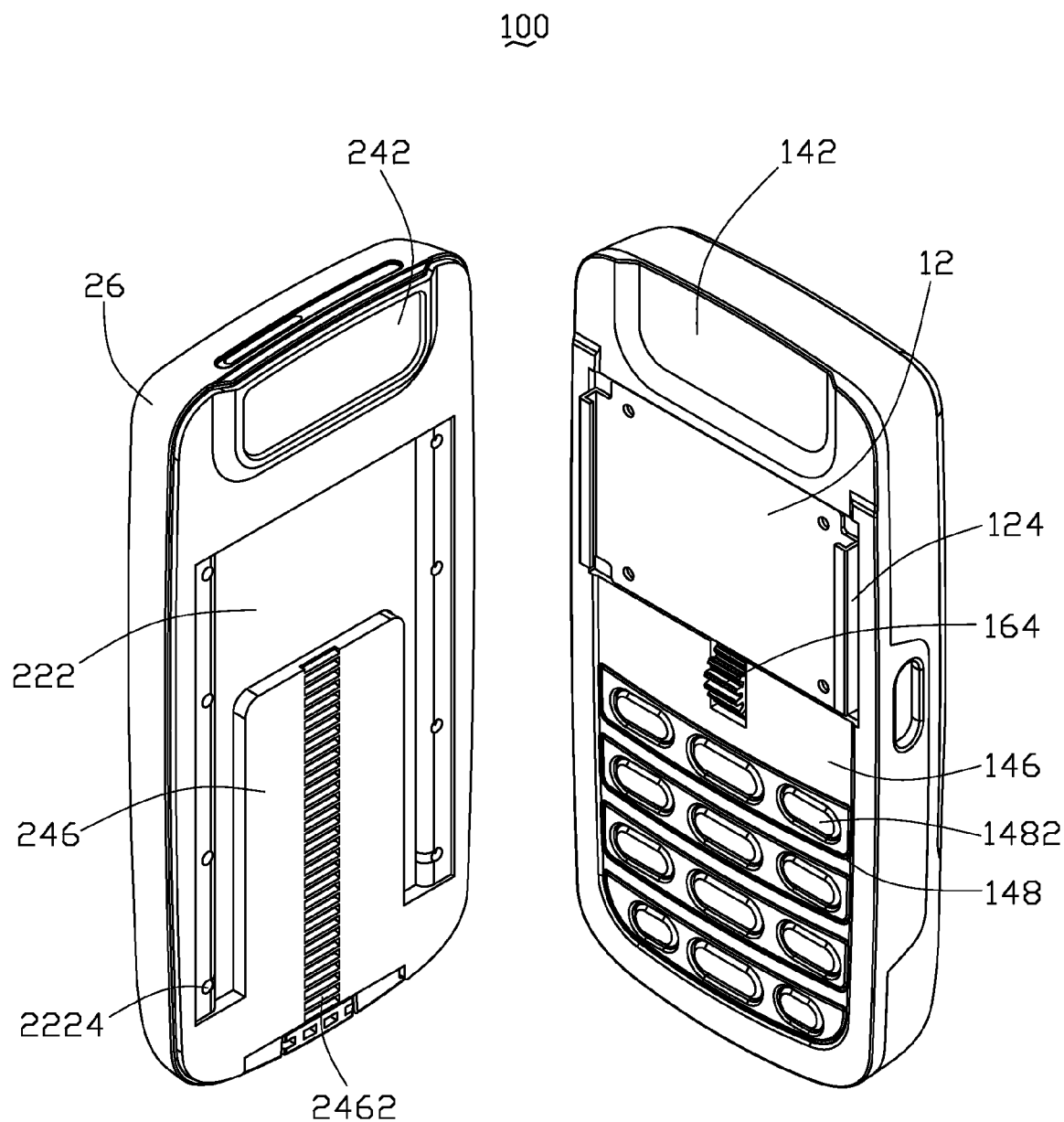
FIG. 5 is a schematic view of inner surfaces of a base and a cover of the portable electronic device shown in FIG. 1.

Also referring to FIG. 2, FIG. 3 and FIG. 5, in assembly, first, the first holding member 18 is received in the back panel 19. Second, the conductive components 1662 are fixed to the retaining portion 182 and the gear 164 is partially received in the mating portion 184, thus the driving device 16 is mounted and electronically connected to the first holding member 18, and can be driven by a power supply (not shown) of the portable electronic device 100. Third, the first housing 14 is aligned with the back panel 19, the ribs 149 are engaged with the latching grooves 192 to assemble the first housing 14 the first holding member 18 and the back panel 19 together. The gear 164 is exposed by the mating hole 1462.

Fourth, the sliding rails 124 of the sliding member 12 are engaged with the sliding grooves 224 of the fixable member 22 from the opening ends of the sliding grooves 224, thus the fixable member 22 is slidably mounted on the sliding member 12. Fifth, fasteners (not shown) are inserted into the first assembling holes 1222 and the second assembling holes 1442 to attach the sliding member 12 to the assembling portion 144 of the first housing 14. Sixth, the fixable member 22 is then received in the receiving groove 244 of the second holding member 24, fasteners (not shown) are inserted into the first screw holes 2224 and the second screw holes 2442 to attach the fixable member 22 to the second holding member 24. Seventh, the rack 2462 is meshed with the exposed gear 164, and the protruding portion 242 is received in the recess 1422 of the concave portion 142. Finally, the second holding member 24 and the fixable member 22 are received into the second housing 26. At least one side button (not shown) configured for controlling the driving device 16 is received in the button hole 1492 and connected with the first holding member 18 and the driving device 16. In this way, the portable electronic device 100 is completed. In the completed portable electronic device 100, the second housing 26, the second holding member 24, the fixable member 22, the sliding member 12, the first housing 14, the first holding member 18, and the back panel 19 are arranged in turn and are positioned substantially parallel to each other.

Figure 6:
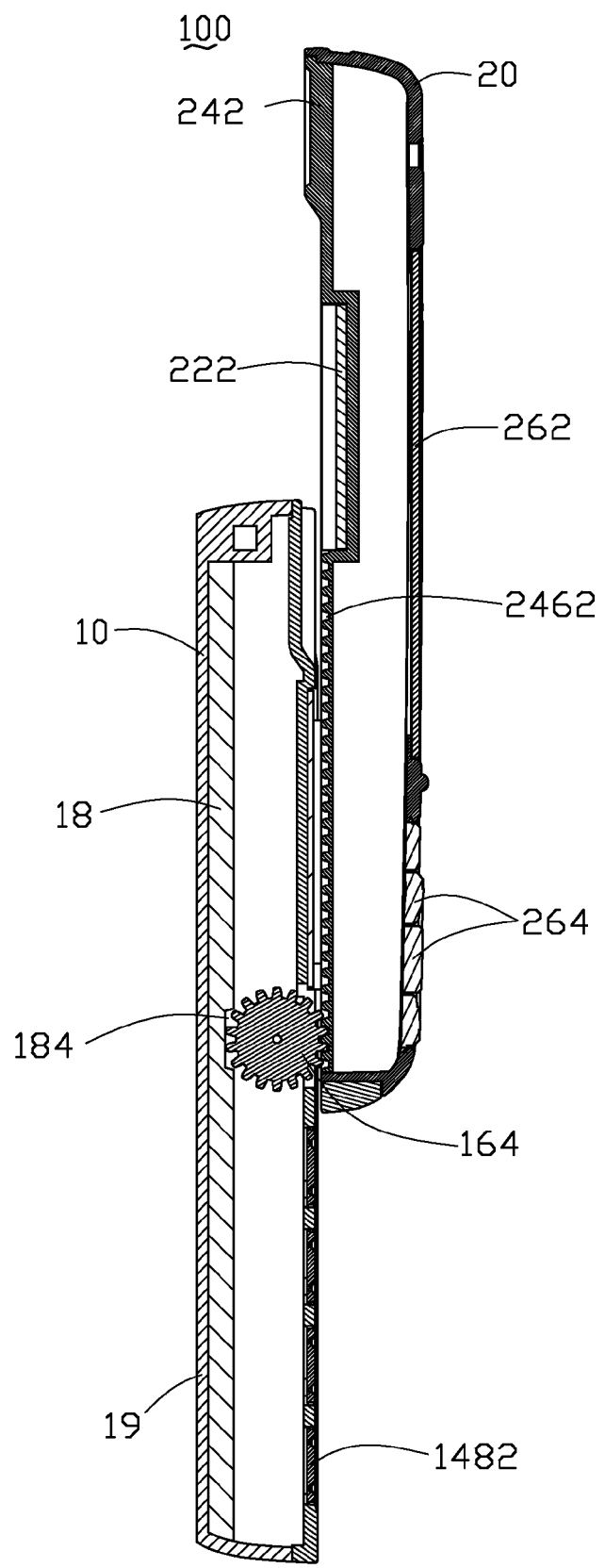
FIG. 6 is a cross-sectional view of the portable electronic device shown in FIG. 1.

Also referring to FIG. 6, in use, when the portable electronic device 100 is closed, the cover 20 covers the keypad 148 of the base 10, the gear 164 meshes with the rack 2462, and the protruding portion 242 of the second holding member 24 is engaged with the concave portion 142 of the first housing 14.

When the portable electronic device 100 is opened, the driving device 16 is operated via the side button(s) received in the button hole 1492. The motor 162 is turned on to drive the gear 164 to rotate towards the concave portion 142. The rack 2462 is driven simultaneously by the rotating gear 164 to move, thus the second holding member 24, the fixable member 22 and the second housing 26 of the cover 20 are also driven to slide relative to and substantially parallel to the sliding member 12, the first housing 14, the first holding member 18, and the back panel 19, and move towards the concave portion 142 until the sliding rails 124 of the base 10 contacts/reaches the close end of the sliding grooves 224, and the motor 162 can then be manually or automatically turned off. In such way, the cover 20 is driven to slide relative to the base 10 and the portable electronic device 100 is completely opened.

When the portable electronic device 100 is closed, the driving device 16 is operated via the side button(s) received in the button hole 1492. The motor 162 is turned on and drives the gear 164 to rotate towards the keypad 148, thus the rack 2462 of the cover 20 is driven to move towards the keypad 148, thereby driving the cover 20 to slide relative to the base 10 and reverse to above sliding process for opening the portable electronic device 100, until the protruding portion 242 engages with the retaining recess 1422. The motor 162 is then turned off, and the cover 20 covers the base 10.

With regard to the portable electronic device 100, the cover 20 can be automatically driven to slide relative to the base 10 by the motor 162. Furthermore, movement of the cover 20 of the portable electronic device 100 can be limited by rigid components. Thus, the portable electronic device 100 does not require any resilient members which can wear out with use. Correspondingly, performance of the structure thereof is enhanced.

Understandably, in the present portable electronic device 100, the sliding member 12, the first housing 14, the driving mechanism 16, the first holding member 18, the fixable member 22 and the second holding member 24 can be incorporated/combined as a sliding mechanism 200, according to an exemplary embodiment, which enables the cover 20 to be slidably mounted on the base 10.

Additionally, the first housing 14 can also be omitted, and the first holding member 18 defines a recess (not shown) corresponding to the protruding portion 242 of the second holding member 24 to limit the cover 20.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A sliding mechanism for a portable electronic device, comprising:
   a first holding member;
   a housing assembled with the first holding member;
   a sliding member fixed to the housing;
   a second holding member including a rack formed thereon;
   a fixable member fixed to the second holding member and slidably mounted on the sliding member; and
   a driving device including a motor fixed on the first holding member and a gear mating with the rack, the motor driving the gear to rotate and drive the rack to move, and further driving the second holding member and the fixable member to slide; wherein the first holding member, the sliding member, the second holding member, and the fixable member are all substantially planar boards and are positioned substantially parallel to each other, and the second holding member and the fixable member are driven to slide substantially parallel to the sliding member, the housing, and the first holding member.

2. The sliding mechanism as claimed in claim 1, wherein the sliding member includes sliding rails and the fixable member defines sliding grooves corresponding to the sliding rails therein, the sliding rails engaging with the sliding grooves to slidably mount the sliding member on the fixable member.

3. The sliding mechanism as claimed in claim 2, wherein each sliding groove has an opening end and an opposite close end.

4. The sliding mechanism as claimed in claim 1, wherein the first holding member is a circuit board electronically connected to the driving device.

5. The sliding mechanism as claimed in claim 1, wherein the second holding member defines a receiving groove configured for receiving the fixable member therein, a protrusion is formed on the second holding member and extends into the receiving groove, and the rack is formed on a surface of the protrusion.

6. The sliding mechanism as claimed in claim 1, wherein the first housing includes a concave portion, and the second holding member includes a protruding portion configured for engaging with the concave portion formed thereon.

7. The sliding mechanism as claimed in claim 1, wherein the housing is assembled between the first holding member and the sliding member and defines a mating hole therein, the gear being fixed on the motor and mating with the rack via the mating hole.

8. A portable electronic device, comprising:
   a base being a substantially planar board and including a housing, a first holding member, a sliding member and a driving device, the sliding member being fixed to the housing, the housing and the first holding member being assembled together, the driving device including a motor fixed to the sliding member and a gear driven to rotate by the motor; and
   a cover being a substantially planar board positioned substantially parallel to the base, slidably mounted on the base and including a second holding member and a fixable member, the second holding member including a rack mating with the gear of the driving device, the fixable member being fixed to the second holding member and slidably mounted on the sliding member, the motor driving the fixable member to slide on the sliding member via the gear and the rack, and further driving the cover to slide relative to the base; wherein the first holding member, the sliding member, the second holding member, and the fixable member are all substantially planar boards and are positioned substantially parallel to each other, and the second holding member and the fixable member are driven to slide substantially parallel to the sliding member, the housing, and the first holding member, such that the cover is driven to slide relative to the base.

9. The portable electronic device as claimed in claim 8, wherein the sliding member includes sliding rails and the fixable member defines sliding grooves corresponding to the sliding rails therein, the sliding rails engaging with the sliding grooves to slidably mount the sliding member on the fixable member.

10. The portable electronic device as claimed in claim 9, wherein each sliding groove has an opening end and an opposite close end.

11. The portable electronic device as claimed in claim 9, wherein the first holding member is a circuit board electronically connected to the driving device.

12. The portable electronic device as claimed in claim 9, wherein the second holding member defines a receiving groove configured for receiving the fixable member therein, a protrusion is formed on the second holding member and extends into the receiving groove, and the rack is formed on a surface of the protrusion.

13. The portable electronic device as claimed in claim 9, wherein the housing includes a concave portion, and the second holding member includes a protruding portion configured for engaging with the concave portion formed thereon.

14. The portable electronic device as claimed in claim 9, wherein the housing is assembled between the first holding member and the sliding member and defines a mating hole therein, the gear being fixed on the motor and mating with the rack via the mating hole.

15. The sliding mechanism as claimed in claim 1, wherein the second holding member, the fixable member, the sliding member, the housing, and the first holding member are arranged in turn.

16. The sliding mechanism as claimed in claim 7, wherein the driving device is positioned between the housing and the first holding member, the first holding member including a mating portion, the mating portion being a recessed portion, the gear partially received in the mating portion.

17. The portable electronic device as claimed in claim 8, wherein the second holding member, the fixable member, the sliding member, the housing, and the first holding member are arranged in turn.

18. The portable electronic device as claimed in claim 14, wherein the driving device is positioned between the housing and the first holding member, the first holding member including a mating portion, the mating portion being a recessed portion, the gear partially received in the mating portion.

* * * * *